United States Patent
Bossaert et al.

[11] 3,886,488
[45] May 27, 1975

[54] SYSTEM FOR THE REAL TIME VISUALIZATION OF ULTRASONIC IMAGES

[75] Inventors: Jean Bossaert; Joel Ernvein; Erich Spitz, all of Paris, France

[73] Assignee: Thomson-CSF, Paris, France

[22] Filed: May 1, 1973

[21] Appl. No.: 356,140

[30] Foreign Application Priority Data
May 5, 1972 France .................. 72.16106

[52] U.S. Cl............ 340/5 MP; 73/67.5 H; 340/5 H
[51] Int. Cl. .................. G01s 9/66; G01n 29/04
[58] Field of Search....... 340/5 MP, 5 H; 73/67.5 H, 73/67.5 R

[56] References Cited
UNITED STATES PATENTS
3,564,905  2/1971  Brenden et al. ................. 73/67.5 H
3,711,823  1/1973  Green .......................... 340/5 H X
3,723,958  3/1973  Heflinger ....................... 340/5 MP Primary Examiner—Richard A. Farley
Attorney, Agent, or Firm—Cushman, Darby & Cushman

[57] ABSTRACT

The present invention relates to the real time visualization of ultrasonic images. The acoustic image conversion system in accordance with the invention comprises a diaphragm forming the bottom of a cell filled with a liquid; a periodic array of masking elements is provided for forming a grating of ripples at the reflective surface of the liquid, and an optical imaging system selects at least one of the radiations diffracted by the grating of ripples under the action of an incoherent illumination.

14 Claims, 6 Drawing Figures

SYSTEM FOR THE REAL TIME VISUALIZATION OF ULTRASONIC IMAGES

The present invention relates to the real time visualization of ultrasonic images which are projected by an ultrasonic beam across which an object has been placed; the invention relates more particularly to acoustic image conversion systems capable of converting a two dimensional vibrational amplitude distribution into a visible image, by means of the liquid-surface-relief method.

Systems of ultrasonic holography, are already in existence. In these systems, a phase hologram is formed at the surface of a liquid in which the object is immersed. The relief fringes of this hologram are then used to diffract coherent light radiation which makes it possible to reconstruct the hologram in the form of a visible image of the object. The chief limitation of the ultrasonic holography method, resides in the very substantial ratio between the wavelengths of the ultrasonic waves and optical waves used respectively to construct and reconstruct the hologram. To obtain a visible detailed image of the object, it is necessary for its ultrasonic image to be projected into the immediate neighbourhood of the plane containing the hologram; furthermore, this detailed image corresponds to an extremely thin slice of the volume of the object. In practice, this method of ultrasonic holography in effect means that only a single section of the object, located at the same plane in which the hologram is formed, is actually displayed; those portions of the objects situated beyond or ahead of this plane, produce images which cannot be utilised because the holographic display principle only yields a small depth of field.

One drawback of display using ultrasonic holography, is due to the need to employ coherent radiation both for the construction of the hologram and for its reconstruction; consequently, the observed images are disturbed by diffraction fringes which are very objectionable and which would not be seen if the radiation utilised were incoherent; a major part of these fringes would be avoided if the optical reconstruction of the image were limited to that section of the object which is sharply reproduced.

To overcome the aforestated drawback, the present invention proposes an acoustic image conversion system in which the ultrasonic image is converted to a visible image without recourse to techniques of holography. This method of display furthermore makes it possible to use incoherent ultrasonic and light radiations this improving the quality of the images.

In accordance with the present invention, there is provided an acoustic image conversion system for the real time visualization of an ultrasonic image constituted by a two dimensional distribution of ultrasonic vibrational amplitudes, said system comprising: a vibrating diaphragm receiving said ultrasonic image, a thin liquid layer overlaying said diaphragm and having a reflective free surface, a periodic array of masking elements extending parallel beneath said free surface for inducing along said free surface a grating of ripples having the pitch of said periodic array, illuminating means for supplying incoherent optical radiation to said free surface, and optical imaging means forming an image of said free surface by selectively receiving at least one of the distinct portions of said optical radiation diffracted by said illuminated grating.

For a better understanding of the present invention and to show how the same may be carried into effect, reference will be made to the ensuing description and the attached figures in which.

Figure 6:
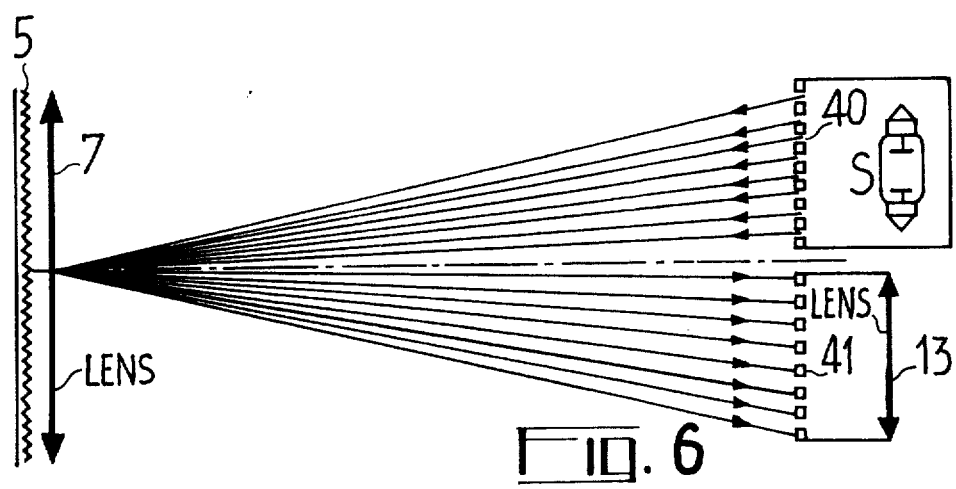

FIG. 6 schematically illustrates a variant embodiment of a visualization system using incoherent light.

Figure 1:
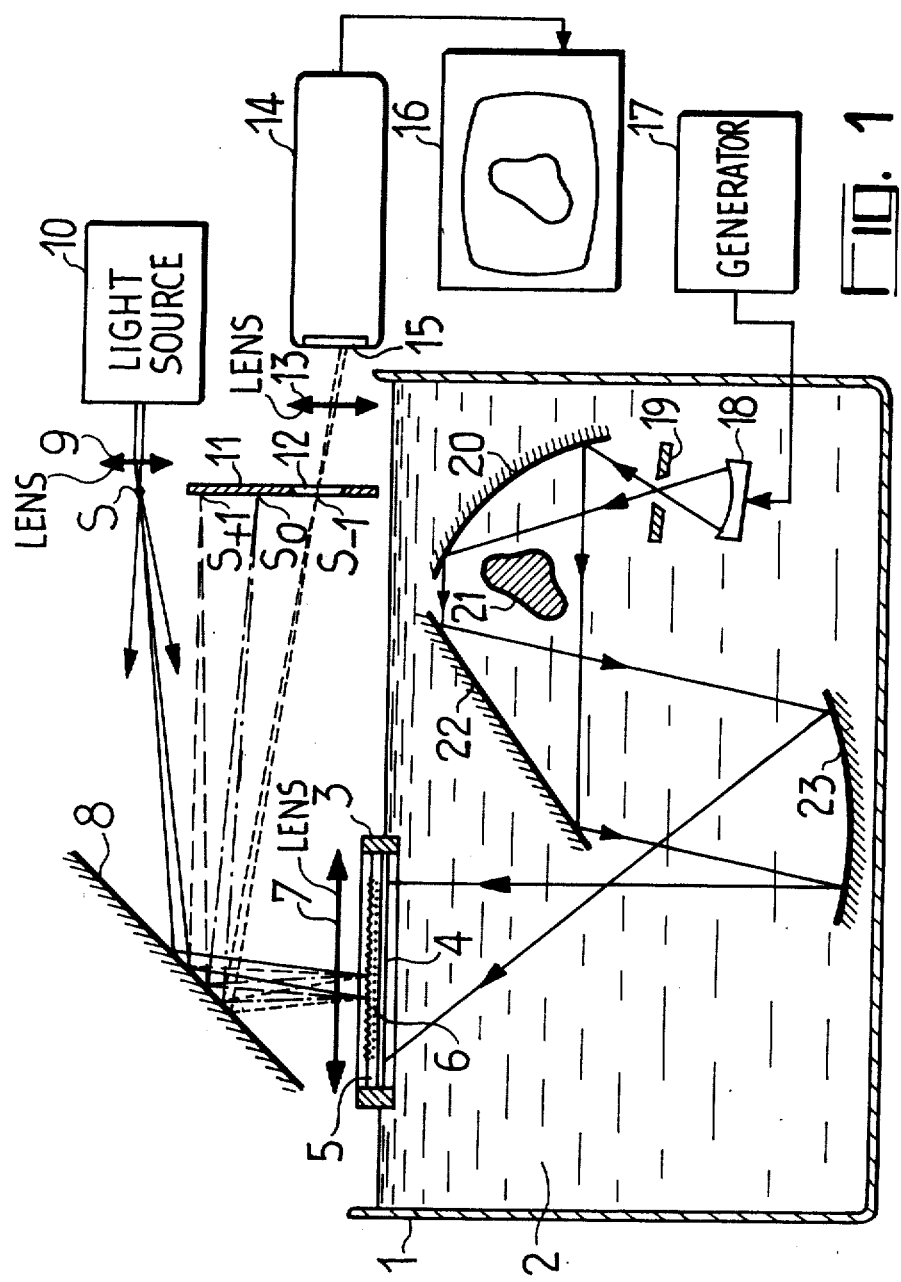
FIG. 1 illustrates an ultrasonic imaging system, equipped with an acoustic image conversion system in accordance with the invention.

FIG. 1 shows an ultrasonic imaging system which makes it possible to form the visible image of an object 21 immersed in the liquid 2 contained in an ultrasonic tank 1. At the surface of the liquid 2, an ultrasonic conversion cell is arranged which receives at the bottom face of a diaphragm 4 ultrasonic radiation constituting the ultrasonic image of the object 21. To this end, the object 21 is arranged in a parallel ultrasonic beam produced by means of a parabolic ultrasonic mirror 20 receiving the ultrasonic radiation emitted by an electromechanical transducer of spherical cap type 18. The point of convergence of the ultrasonic energy radiated by the transducer 18 coincides with the focus of the mirror 20. A filter pin-hole diaphragm 19 eliminates secondary lobes, in order that the acoustic wave received by the mirror 20 shall be substantially spherical. The parallel beam illuminating the object 21 is received by a flat reflector 22 which cooperates with a spherical reflector 23, to project the ultrasonic image of the object onto the entry face of a conversion cell; preferentially, the projection system 22, 23 will have a magnification factor of −1, in order to reduce aberrations. The conversion cell has a diaphragm 4 in contact with the underlying propagation medium 2. Under the action of the incident ultrasonic radiation, the diaphragm 4 is imparted an ultrasonic vibrational movement characterised by a two-dimensional distribution of vibrational amplitudes. In the case shown in FIG. 1, this distribution corresponds to the ultrasonic image of the object 21, but the distribution may be an entirely arbitrary one. The ultrasonic vibrational movement communicated to the diaphragm 4 is transmitted to a thin liquid layer 5 the free surface of which being raised under the effect of the radiation pressure. This layer 5 is contained in a frame 3 over which the diaphragm 4 is stretched. The surface of the layer 5 lifts under the action of the ultrasonic radiation and the rise varies in accordance with the ultrasonic radiation pressure.

In accordance with the invention, a periodic array of masking elements 6 is arranged beneath the surface of the layer 5 in order at the surface thereof, to obtain a grating of ripples capable of diffracting incident electromagnetic radiation in predetermined directions. In FIG. 1, the array of masking elements 6 is constituted, by way of non-limitative example, by a grid of parallel equidistantly spaced wires immersed in the layer 5. The ultrasonic radiation transmitted by the diaphragm 4 is periodically occulted by the wires of the grid, and this generates a periodic rise in the surface level of the film 5 to a height which is the greater the more intense the local ultrasonic radiation. The ultrasonic conversion cell thus converts the ultrasonic field received by its bottom face, into a periodic, undulating surface relief, this relief is the more pronounced the higher the intensity.

From the optical point of view, the reflective surface of the layer behaves like a diffraction grating capable of reflecting electromagnetic radiation of wavelength $\lambda$, in several different directions.

To illuminate the surface of the layer 5, in FIG. 1 a convergent lens 7, a flat mirror 8 and a point radiation source S located in the focal plane of the system 7, 8 are provided. In FIG. 1, this point source is in the form of a lens 9 focussing light emitted by a laser 10; it will be seen in the course of the ensuing description, that it is by no means necessary to utilise a laser as the light source. In the absence of incident ultrasonic radiation, the surface of the liquid layer 5 is perfectly smooth so that it reflects the radiation coming from S, to a point $S_o$ which is the image of the source S. Under the action of incident ultrasonic radiation, the surface of the liquid layer 5 becomes covered with ripples and behaves like a diffraction grating, reflecting the radiation coming from S to several distinct locations $S_{+1}$, $S_o$ and $S_{-1}$; these locations respectively corresponding to the diffraction orders +1, 0 and −1, of the grating of ripples thus formed. The directions of emergence of these diffraction orders are of course the further away from one another the closer together the ripples are. The spacing between the reflected images increases, furthermore, with the focal length of the lens 7. If the source S is not monochromatic and if its spectrum is not too wide, the images $S_{+1}$, $S_{-1}$, will cease to be point images in the true sense, but it is still possible to arrange that they do not overlap the point image $S_o$.

In order for the liquid layer 5 to give rise to a visible image, the invention provides for the selection, by means of a diaphragm 11, of a portion of diffracted energy corresponding to at least one of the diffraction orders of the grating of ripples. In FIG. 1, the diaphragm 11 contains a hole 12 which transmits the diffracted rays corresponding to the image $S_{-1}$ of the source S. The diffracted rays which pass through the hole 12, are then picked by a lens 13, capable of forming the image of the surface of film 5 upon the target 15 of a camera tube 14. The camera tube 14 thus supplies a video frequency to a television monitor 16 upon the screen of which the image of the object 21 can readily be seen. The ultrasonic imaging system of FIG. 1 is completed by an electrical generator 17 which provides the ultrasonic power for the transducer 18. The generator 17 can produce a pure sinusoidal voltage or a voltage whose frequency spectrum is not limited to a single frequency, since the ultrasonic radiation need not necessarily be coherent, there is even some advantage in utilising incoherent ultrasonic radiation. By the same token, several ultrasonic radiation sources can be utilised to illuminate the object.

In FIG. 1, it should clearly be understood that the ultrasonic imaging system comprises means for the excitation of a conversion cell, and acoustic image conversion means which include said cell. The ultrasonic excitation means can differ from those illustrated, and also the display elements 3 to 13 can form a visible image of any arbitrary kind of distribution of vibrational amplitudes. For example, the elements 3 to 13 could be used to display the nodes and antinodes which characterise standing wave vibrations in a solid structure.

Figure 2:
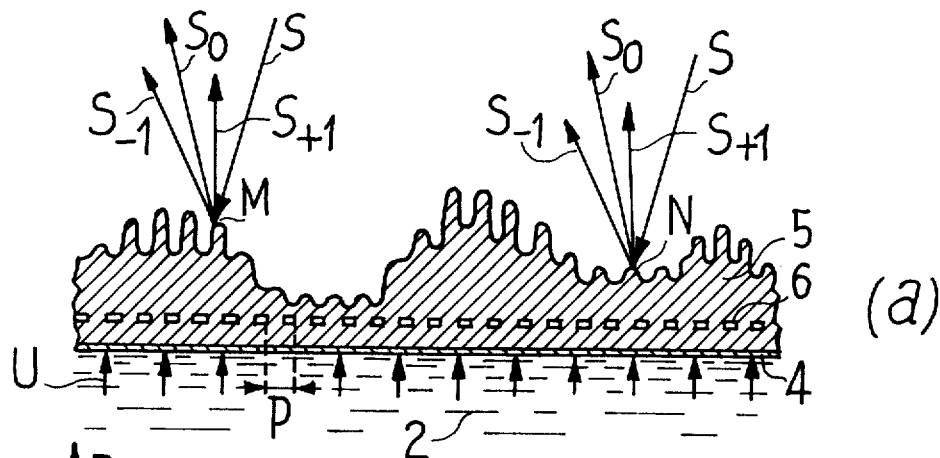
FIG. 2 is an explanatory diagram.
Figure 2:
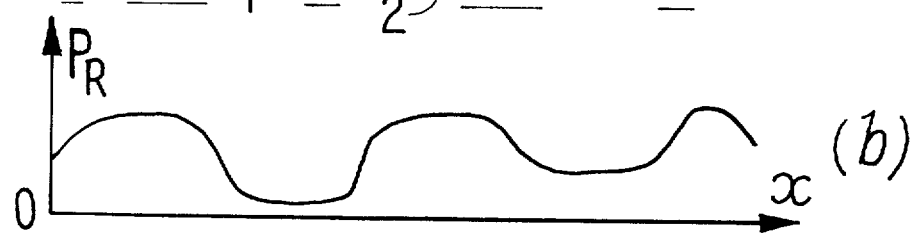

The explanation of the acoustic image conversion system will be better understood from a consideration of FIG. 2 where at (a) a fragment of the conversion cell of FIG. 1 can be seen. This fragment shows, more clearly than in FIG. 1, a propagation medium 2 in contact with a stretched diaphragm 4 which is receiving incident ultrasonic radiation U. At (b), in FIG. 2, the law of variation in the direction $x$, of the radiation pressure $P_R$ of the ultrasonic radiation U, can be seen. The grid 6, of constant pitch p, is immersed in an oil layer 5, whose surface undulation under the action of the radiation pressure $P_R$ has been very much exaggerated. It will be seen that the surface of the oil layer 5 exhibits an assembly of ripples having a greater or lesser depth. The crests of these ripples are localised opposite the interstices of the grid 6, because the bars of the latter periodically occult the incident ultrasonic field. If $z$ represents the height of the undulating profile of the surface of the liquid layer 5, then the equation of this profile can be written as follows, limiting ourselves to variations in the x direction in order to simplify matters:

$$z(x) = h(x).\sin wx + h_o(x)$$

where:
 $w$ is the spatial angular frequency $2\pi/p$ of the grid.
 $h(x)$ is the depth of the ripples as a function of the radiation pressure $P_R$;
and
 $h_o(x)$ is the mean elevation of the oil film also as a function of the radiation pressure $P_R$.

If, to the oil film, an electromagnetic wave S is applied having a wave number $k$ and a complex amplitude $E_o$, the radiation E reflected by the reflective surface of the oil film can be written as:

$$E = E_o.e^{-j\,k\,[z\,-\,2z\,(x)]}$$

expanding this, we obtain:

$$E = E_o.e^{-j\,k\,[z\,-\,2h_o\,(x)]}.e^{2j\,k\,h\,(x)\,\sin\,w.x}$$

If we neglect the phased term $e^{-j\,k\,[z\,-\,2h_o(x)]}$ and take a Bessel function development, then we obtain the amplitudes diffracted in the different orders represented by the diffracted rays $S_o$, $S_{+1}$, and $S_{-1}$:

$$E = E_o.J_o\,[2k\,h\,(x)]$$
$$+ E_o.\sum_{n=1}^{\infty} J_n\left[2\,k\,h\,(x)\right]$$
$$\left[e^{j\,n\,w\,x} + (-1)^n.e^{-j\,n\,w\,x}\right]$$

This latter expression shows that with a phase modulation index of $2\,kh = 1.8$, the amplitude term pertaining to the order +1 is $J_1 = 0.58$, showing that 33.6 percent of the incident radiation is contained in the diffracted rays $S_{+1}$ and $S_{-1}$.

This energy distribution is obtained at a ripple depth of $h = 1.8/2\,k$. With a diffracted radiation of wavelength equal to 0.6328 microns (Helium-Neon Laser), this depth is equal to 0.09 microns.

The angular dispersion of the diffracted rays, corresponding to the various diffraction orders, is a function of the spatial angular frequency w and of the wave number $k$ of the diffracted radiation.

In FIG. 2, considering points M and N on the surface of the oil layer 5, which are respectively located in regions where the radiation pressure $P_R$ is high and low, it will be seen that an incident ray S is diffracted in accordance with the directions $S_{+1}$, $S_o$ and $S_{118\ 1}$. However, from the foregoing analysis, the diffracted energy emerging from the point M where the ripples are deep, is not confined to the direction $S_o$, and appreciable portions of this energy takes the directions $S_{+1}$ and $S_{118\ 1}$; this behaviour on the part of the diffracted energy, is the more marked the deeper the ripples are. By contrast, the diffracted energy emerging from the point N where the ripples are shallower, is reflected entirely in the direction $S_o$.

By selecting the energy fraction diffracted in the direction $S_{+1}$, it is observed that the point M has a much greater brightness than the point N; the result is that the assembly of the surface of the layer 5 produces a contrasted image the bright areas of which correspond to the zones which are receiving a high radiation pressure. If the energy fraction diffracted in the direction $S_o$, had been selected then the image of the film would have the reverse contrast.

As far as the periodic array of masking elements 6 is concerned, the pitch p should be chosen bearing in mind the maximum fineness of the ripples which can be formed at the surface of the liquid layer 5. In the case of an oil layer, experience shows that the ripple surface can contain up to 20 ripples per centimetre. Thus, the array 6 can take the form of a grid of a pitch of around 0.5 millimetres; the wires of this grid should be made of a material having an acoustic impedance which is substantially different from that of their environment. If the wires are immersed in an oil film, they can be made of a material of high compressibility and low density or, on the other hand, of an incompressible material of high density. It goes without saying that the array of masking elements 6 can have an arbitrary periodic structure. In particular, it can be formed by superimposing several arrays of intersecting wires in order to form meshes.

Figure 3:
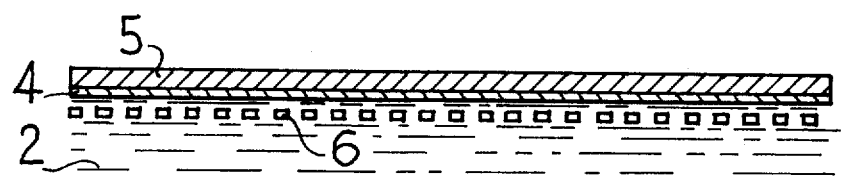
FIG. 3 illustrates a fragmentary view of a first embodiment of a conversion cell in accordance with the invention.

In FIG. 3, a variant embodiment of the conversion cell of FIG. 1 can be seen. The array of masking elements 6 is not immersed in the liquid layer 5 but is arranged before the diaphragm 4 in order to periodically occult the ultrasonic field incident upon said diaphragm 4. The material of which said array of masking elements 6 is made, should then present an impedance break vis-a-vis the propagation medium 2.

Figure 4:
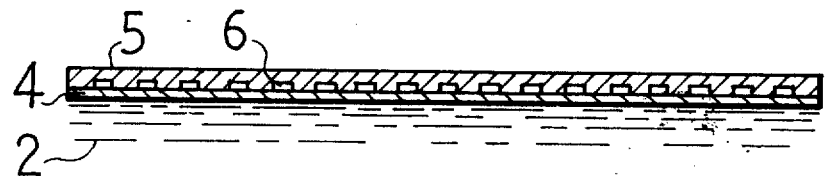
FIG. 4 illustrates a fragmentary view of a second embodiment of a conversion cell in accordance with the invention.

In FIG. 4, another variant embodiment of the conversion cell in FIG. 1, can be seen. The array of masking elements 6 is here integral with the diaphragm 4 and can be deposited upon one or the other faces thereof. If this method of design of the cell is used, the array of masking elements 6 can be constituted by a mosaic of independent tablets, arranged in accordance with the regular meshes of a lattice.

The ultrasonic imaging system hereinbefore described, differs radically from ultrasonic holography systems because in order to obtain the rippled surface, it is not necessary to produce interference between two coherent ultrasonic beams, nor, moreover, in order to read out this rippled surface by optical means is it required to use coherent read-out radiation.

As far as the ultrasonic wave exciting the receiving face of the conversion cell is concerned, the simplification of the system in accordance with the invention is due to the use of a single ultrasonic beam. This beam is generally coherent, however, it would be possible to modify the excitation conditions of the transducer, in order that this should not be so.

As far as the read out radiation for the grating of ripples is concerned, there is a choice of utilising coherent radiation or incoherent radiation. If the incoherent radiation is used, then speckle in the visual image is avoided. On the other hand, it is not absolutely essential to use visible radiation since the camera tube 14 of FIG. 1 may for example be sensitive to infra red readout radiation.

Figure 5:
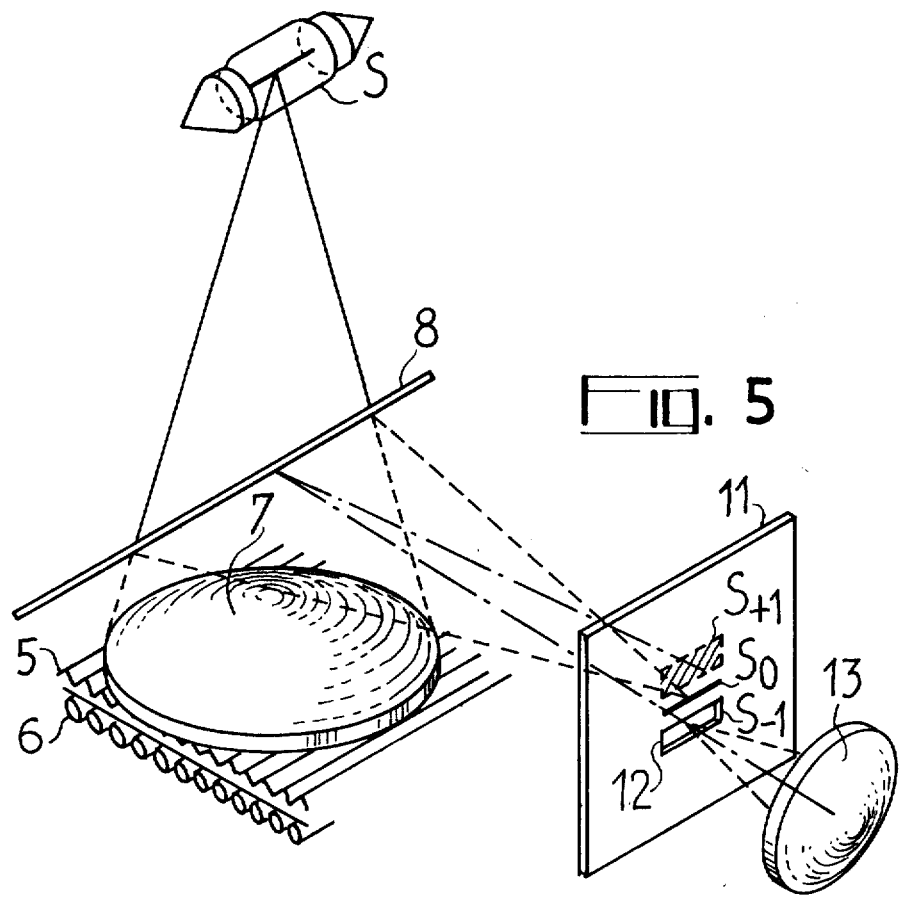
FIG. 5 is a fragmentary view of the system shown in FIG. 1 illustrating its operation when using incoherent optical radiation.

FIG. 5 illustrates the operation of the acoustic image conversion system in the case in which incoherent light emitted by the incandescent filament of a bulb S, is used. This small linear light source illuminates oil layer 5 through a semitransparent mirror 8 which projects the image of the focal plane of the lens 7 onto the diaphragm 11. The orientation given to the filament, is that of the ripples which form at the surface of the oil layer under application of ultrasonic radiation.

The light reflected by the oil layer is picked up by the lens 7 and then reflected by the mirror 8 which projects it onto the diaphragm 11. At the centre of the diaphragm, the zero order radiation gives rise to a sharp image $S_o$ of the filament of the bulb S; this white light line is surrounded by light spots $S_{+1}$ and $S_{-1}$ which can be considered as the images or orders +1 and −1 of the filament, as diffracted by the ripples surfaces of the oil layer. If the focal length of the lens 7 is appropriately chosen the blurred images $S_{+1}$ and $S_{-1}$ can be completely separated from the image $S_o$; this makes it possible to arrange that the hole 12 formed in the diaphragm 11 selectively transmits the image $S_{-1}$ of the source S, to the projection lens 13. In view of the fact that the diffracted energy transmitted via the diaphragm 11 increases with the height of the ripples in the layer 5, it is possible to form the contrasted image of the oil layer on a projection screen placed behind the lens 13. The illumination of the projection screen can be increased by also transmitting the image $S_{+1}$ of the filament. The higher order images, which have not been illustrated in FIG. 5, can also be transmitted and this ultimately comes down to suppressing only sharp image $S_o$ by the use of a plate or screen which precisely covers it. On the lens 13, there is then collected all the diffracted radiation except that which contributes to the formation of the image $S_o$.

Using this principle, it is conceivable that a discharge lamp can be used, in accordance with the diagram shown in FIG. 6. Since this is a relatively extensive source, there is no question of forming its image directly upon the filter diaphragm. Therefore, in the focal plane of the lens 7 a grid of equidistantly spaced slots 40 is arranged, these receiving the light emitted by the source S. The image of this grid is projected onto a grid of opaque bars 41 likewise arranged in the focal plane of the lens 7. The structure and position of the grid 41, are contrived so that the bars constituting it exactly cover the zero order image of the grid of light slots 40. The light passing through the gaps between the bars of the grid 41, is picked up by the projection lens 13 and we thus return to the case just described. It is a good idea to choose the structure of the grids 41 and 40 as a function of the wavelength of the light, of the focal length of the lens 7 and of the pitch of the ripples in the oil layer 5, so that the light diffracted in orders 1, 2, 3 et cetera, passes through the interstices of the network 41 and does not strike the opaque bars thereof. The light rays represented in FIG. 6, are those which are to be occulted by the grid 41; these belong to the zero order radiation whose intensity is maximum in the absence of ripples. The grids 40 and 41 are constituted by mosaics of holes and opaque tablets, when the surface of the layer 5 comprises two intersecting grating of ripples.

What we claim is:

1. Ultrasonic image conversion system for the real time visualization of an ultrasonic image constituted by a two dimensional distribution of ultrasonic vibrational amplitudes, said system comprising: a vibrating diaphragm positioned for receiving said ultrasonic image, a thin liquid layer overlaying said diaphragm and having a reflective free surface, a periodic array of masking elements extending parallel beneath said free surface for inducing along said free surface a grating of ripples having the pitch of said periodic array, illuminating means for supplying incoherent optical radiation to said free surface, and optical imaging means forming an image of said free surface by selectively receiving at least one of the distinct portions of said incoherent optical radiation diffracted by said grating; said illuminating means comprising a field lens and a source of incoherent electromagnetic radiation arranged in the focal plane of said lens.

2. Ultrasonic image conversion system as claimed in claim 1, wherein said array of masking elements is immersed in said liquid layer.

3. Ultrasonic image conversion system as claimed in claim 1, wherein said array of masking elements is located on one side of said diaphragm in order to be immersed in the propagation medium through which the ultrasonic energy carrying said image propagates.

4. Ultrasonic image conversion system as claimed in claim 1, wherein said array of masking elements is integral with said diaphragm.

5. Ultrasonic image conversion system as claimed in claim 1, wherein said array of masking elements is constituted by at least one grid of constant pitch wires.

6. Ultrasonic image conversion system as claimed in claim 4, wherein said array of masking elements is constituted by regularly spaced independent obstacles.

7. Ultrasonic image conversion system as claimed in claim 1, wherein said field lens has its optical axis perpendicular to said free surface, said source being eccentric in relation to said optical axis.

8. Ultrasonic image conversion system as claimed in claim 1, wherein said optical imaging means comprise a perforated diaphragm located in said focal plane, said perforated diaphragm transmitting selectively, at least one of the images of said source, diffracted by said free surface in the presence of said ultrasonic energy; said optical imaging means further comprising a further lens arranged behind said perforated diaphragm and cooperating with said field lens in order to project an image of said free surface.

9. Ultrasonic image conversion system as claimed in claim 9, wherein said source is the filament of an incendescent bulb; said perforated diaphragm being arranged in the focal plane of said lens in order to occult the zero order image of said filament.

10. Ultrasonic image conversion system as claimed in claim 8, wherein said source is constituted by a screen receiving incoherent radiation, said screen comprising perforations arranged in a grid fashion in said focal plane, and a further apertured screen being arranged in said focal plane in order to selectively occult the zero order image of the assembly of said perforations.

11. An ultrasonic imaging system for visualization of an object by means of an ultrasonic image conversion system as claimed in claim 1, wherein said diaphragm is in contact with a liquid contained in an ultrasonic tank; said object being immersed in said tank; said tank comprising insonification means for emitting an ultrasonic beam irradiating said object, and means for projecting the ultrasonic image of said object on to the face of said diaphragm which is in contact with the liquid filling said tank.

12. An ultrasonic imaging system as claimed in claim 11, wherein said projection means comprise a spherical ultrasonic mirror designed to form the image of said object at a magnification factor substantially equal to −1.

13. An ultrasonic imaging system as claimed in claim 11, wherein said insonification means comprise an electromechanical transducer of spherical cap design, a concave ultrasonic mirror with its focus located at the centre of the curvature of said spherical cap, and a filter pin hole diaphragm, the hole in which coincides with the said centre of curvature.

14. An ultrasonic imaging system as claimed in claim 11, wherein said insonification means comprise at least one electromechanical transducer associated with an electrical generator producing an alternating voltage whose frequency spectrum comprises more than one ultrasonic emission frequency.

* * * * *